United States Patent
Osinga et al.

(10) Patent No.: US 6,984,951 B2
(45) Date of Patent: Jan. 10, 2006

(54) DRIVE ASSEMBLY FOR A COVERING OF AN ARCHITECTURAL OPENING

(75) Inventors: Anne J. Osinga, Rockanje (NL); Jochem Welvaadt, Amsterdam (NL)

(73) Assignee: Turnils AB, Alingsas (SE)

( * ) Notice: Subject to any disclaimer, the term of this patent is extended or adjusted under 35 U.S.C. 154(b) by 0 days.

(21) Appl. No.: 10/754,819

(22) Filed: Jan. 9, 2004

(65) Prior Publication Data

US 2004/0155614 A1 Aug. 12, 2004

Related U.S. Application Data

(63) Continuation of application No. 10/062,969, filed on Jan. 30, 2002, now Pat. No. 6,781,335.

(30) Foreign Application Priority Data

Jan. 30, 2001 (EP) .............................. 01300816

(51) Int. Cl.
G05B 5/00 (2006.01)

(52) U.S. Cl. .................. 318/480; 318/469; 318/439
(58) Field of Classification Search ................ 318/480, 318/469, 17, 439; 160/681; 320/127; 363/59, 363/21, 25, 138, 439; 364/167.01
See application file for complete search history.

(56) References Cited

U.S. PATENT DOCUMENTS

| | | | |
|---|---|---|---|
| 3,823,358 A | 7/1974 | Rey | 320/3 |
| 4,415,959 A | 11/1983 | Vinciarelli | 363/21 |
| 4,441,146 A | 4/1984 | Vinciarelli | 307/571 |
| 4,445,055 A | 4/1984 | Bete | 307/571 |
| 4,686,441 A | 8/1987 | Petterson | 320/2 |
| 4,807,686 A | 2/1989 | Schnebly et al. | 160/84.1 |
| 4,890,021 A | 12/1989 | Walker | 307/572 |
| 4,970,451 A | 11/1990 | Suomalainen | 323/222 |
| 5,139,894 A | 8/1992 | Mizuno et al. | 429/9 |
| 5,221,891 A | 6/1993 | Janda et al. | 323/350 |
| 5,581,455 A | 12/1996 | Rossi et al. | 363/60 |
| 5,621,620 A | 4/1997 | Machida et al. | 363/16 |
| 5,659,241 A | 8/1997 | Horiuchi et al. | 323/222 |
| 5,675,487 A | 10/1997 | Patterson et al. | 364/167.01 |
| 5,691,632 A | 11/1997 | Otake | 323/282 |
| 5,745,350 A | 4/1998 | Archer et al. | 363/15 |
| 5,760,558 A | 6/1998 | Popat | 318/480 |
| 5,793,184 A | 8/1998 | O'Connor | 370/101 |
| 5,825,163 A | 10/1998 | Pontarollo | 323/222 |
| 5,834,977 A | 11/1998 | Maehara et al. | 330/297 |
| 5,959,432 A | 9/1999 | Saurer et al. | 320/101 |
| 6,094,036 A | 7/2000 | Rampold | 323/266 |
| 6,100,665 A | 8/2000 | Alderman | 320/127 |
| 6,163,201 A | 12/2000 | Schweighofer | 327/496 |
| 6,426,601 B1 | 7/2002 | De Filippis et al. | 318/139 |
| 6,476,315 B2 | 11/2002 | Ganz | 136/244 |
| 6,484,069 B2 | 11/2002 | Osinga | 700/275 |
| 2003/0210020 A1 * | 11/2003 | Zhang | 323/225 |
| 2003/0214269 A1 * | 11/2003 | Shiue et al. | 320/166 |

FOREIGN PATENT DOCUMENTS

| | | |
|---|---|---|
| DE | 29 00 622 | 7/1980 |
| DE | 3050807 | 7/1984 |
| DE | 3408396 | 9/1985 |
| DE | 3610035 | 9/1987 |
| DE | 4334581 | 4/1995 |
| EP | 0 443 155 | 12/1990 |
| EP | 0 685 921 | 12/1995 |
| JP | 3-74169 | 3/1991 |
| JP | 4-168972 | 6/1992 |
| JP | 2001-251849 | 9/2001 |
| WO | WO 02/41740 | 5/2002 |
| WO | WO 02/061929 | 8/2002 |

* cited by examiner

*Primary Examiner*—Karen Masih
(74) *Attorney, Agent, or Firm*—Dorsey & Whitney LLP

(57) ABSTRACT

An electrically-operated architectural covering that can be powered by a low current or voltage source includes a motor, an accumulator connected to the motor, a power source, and an electrical circuit connecting the power source to the accumulator. The electrical circuit includes a step-up converter, which preferably includes an input terminal connected to the power source; an output terminal with a supply voltage connected to the accumulator; an inductive element; a first switch having a gate electrode for opening and closing of the switch when a control voltage of a first level is applied to the gate; and an oscillator.

22 Claims, 6 Drawing Sheets

DRIVE ASSEMBLY FOR A COVERING OF AN ARCHITECTURAL OPENING

CROSS-REFERENCE TO RELATED APPLICATION

This application is a continuation of U.S. patent application Ser. No. 10/062,969, filed on Jan. 30, 2002 now U.S. Pat. No. 6,781,335, which corresponds to and claims benefit to European application number 01300816.4, filed Jan. 30, 2001. U.S. application Ser. No. 10/062,969 and European application number 01300816.4 are both hereby incorporated by reference as though fully set forth herein.

BACKGROUND OF THE INVENTION a. Field of the Invention

The invention relates to a drive assembly for a covering of an architectural opening, comprising a motor drive, an accumulator connected to the motor drive, a power source and an electrical circuit connecting the power source to the accumulator.

b. Background Art

Light regulating devices, such as retractable and extendable awnings and control systems for automatically extending such awnings are known.

Motor driven venetian blinds comprising either vertical or horizontal slats are known, which can be opened by retracting the slats to one side of the window and in which the position of the slats around their longitudinal axis can be controlled electrically via a control unit, which blinds are powered from the main power supply.

BRIEF SUMMARY OF THE INVENTION

It is an object of the present invention to provide a drive assembly for a covering of an architectural opening, which can be operated electrically and which can be powered by a relatively low current or voltage power source.

It is in particular an object of the present invention to provide a drive assembly which can be operated by a photovoltaic cell of relatively small dimensions and operating at low light level conditions.

It is again an object of the present invention to provide a drive assembly using an electrical circuit connecting the power source to the accumulator, which is self-starting and which uses a relatively small number of components.

It is a further object of the present invention to provide a drive assembly having an electrical circuit in which power losses are minimized and which is of compact design.

It is still a further object of the present invention to provide a drive assembly with an electrical circuit, which can operate at or near the maximum power point of a solar cell.

Thereto, the drive assembly according to the present invention is characterized in that the electrical circuit comprises a step-up converter.

The step-up converter transforms the small fluctuating voltage or current derived from the power source to DC current ranging from 1–20 V, suitable for charging the accumulator for operating the motor drive. Use of the step-up converter allows the drive assembly to be powered by a solar cell of small dimensions, which may be mounted for instance at the inside of a window on the head rail of a venetian blind, facing towards the inside of the building, or being placed on any position on the windowsill.

An embodiment of the drive assembly according to the present invention comprises a step-up converter with an input terminal connected to the power source and an output terminal with a supply voltage, connected to the accumulator, the step-up converter circuit having:

- an input terminal for connection to a varying voltage or current source, and an output terminal with a supply voltage,
- an inductive element being with a first terminal connected to the input terminal and with a second terminal to a capacitive element and to the output terminal, the capacitive element being with one terminal connected to a reference voltage,
- a first switch being with a first terminal connected to the second terminal of the inductive element, and with a second terminal to the reference voltage, the first switch comprising a gate electrode for opening and closing of the switch when a control voltage of a first level is applied to the gate,
- an oscillator comprising a power input connected to the output terminal, a start-up output connected to the gate electrode of the first switch for supplying a pulse-like signal to the gate electrode and an oscillator output.

The energy from the power source is stored in the inductive element and is periodically charging the capacitor for forming and increasing supply voltage on the output terminal. This increasing supply voltage is fed into the oscillator, which output signal rises as a consequence resulting in better control of the switch and hence more power being input into the capacitive element, such that the voltage of the output terminal is increased.

In a preferred embodiment, the step-up converter further comprises a second switch connected in parallel with the first switch, the second switch having a gate electrode connected to the oscillator output, wherein the first switch remains opened when the supply voltage at the output terminal reaches a predetermined level, and the second switch is operated by the oscillator output at a second voltage level that is higher than the first voltage level.

The varying input voltage is fed into the inductive element, which is periodically connected to reference voltage by opening of the first switch under control of the start-up output of the oscillator. The power input of the oscillator is connected to the supply voltage terminal, which at start-up receives a very small voltage. The resulting start-up output voltage is correspondingly small, for instance 0.2 V or less. When the first switch is opened and closed again, a rising current is generated in the inductive element, which charges the capacitive element such that the supply voltage is successively increased. The first switch is particularly suited to be operated at a low gate control voltage from the start-up output of the oscillator. As the supply voltage increases, the start-up output signal of the oscillator will increase, resulting in better operation of the first switch and more power being transferred from the inductive element to the capacitive element, such that a self-amplifying effect results in increasing the supply voltage and the oscillator start-up output signal. When the supply voltage reaches a predetermined value, the first switch is de-activated (opened) and the second switch is operated from a second oscillator output, at a gate control voltage, which is above the gate control voltage of the first switch. Operation of the second switch results in a further increase in the supply voltage. The first switch may for instance be formed by a bipolar pnp-transistor with a gate control voltage of 0.6 V above reference voltage, a collector-emitter voltage Vce of 600 mV at a collector current Ic of 100 mA. The second switch may be formed by a low power logic level MOSFET with a gate control voltage Vgs (gate threshold voltage) generally in the range of 1–2 V at a source voltage Vds of 2 V and at a current Ids of 0.3–1.2A.

By the use of the two switches according to the present invention, each operating at a different gate control voltage level, a self-starting step-up converter is achieved.

In one embodiment, a diode is connected between the second terminal of the inductive element at the gate electrode of the first switch. When a varying supply voltage of about 0.4 V is offered to the input terminal, and the supply voltage is about 0.4 V, a 0.4 V bias voltage on the control terminal of the first switch is maintained by the positive clamp formed by the diode. Hence, in case the first switch is formed by a pnp bipolar transistor, only a 0.2 V varying control voltage is necessary at the gate to bring the transistor into conduction. The 0.2 V varying voltage is obtained from the oscillator when powered at its input by a 0.4 V supply voltage level.

In a further embodiment, the outputs of the oscillator are connected to the gates via respective capacitive elements. By the capacitive element coupling, the small DC control voltage from the start-up output of the oscillator is added to the 0.4 V DC level of the diode clamp.

A voltage converting unit may be formed by attaching a second converting stage to the voltage converting circuit, the second converting stage having an inductive element with a first terminal connectable to the varying voltage source, and connected with a second terminal to a first terminal of an electrical element such as an accumulator, the accumulator being with a second terminal connected to the reference voltage, a third switch being connected between the second terminal of the inductive element and the reference voltage and being with a gate electrode connected to an oscillator output of a second oscillator, the supply voltage of the output terminal of the voltage converting circuit being connected to the second terminal of the inductive element and to a power input of the second oscillator. The third switch may be formed by a power MOSFET having multiple drains and multiple sources for further converting the DC-voltage from the converting circuit to levels of between 3–15 V.

The voltage converting circuit according to the present invention may be applied in combination with a solar cell as a power source, a fuel cell or other varying voltage or current sources having relatively small current and voltages at their output. The voltage-converting unit according to the present invention may be part of a cattle watering unit, country road lighting or an electrical fence in the countryside when as a voltage source a solar cell is used. Other applications in combination with a solar cell are digital billboards, billboard lighting, street lighting or information points.

Furthermore, the device of the present invention can be used to power speed control devices along roads, roadside reflectors or road markings (cat eyes), emergency points, etc.

Alternatively, the voltage converting circuit can be applied in marine applications as a generator on boats, for boat lighting, as a navigation device or a GPS-system.

Mobile phones, laptops, organisers, and other appliances may be powered by the voltage converting circuit which only needs a very small voltage input.

Furthermore, digital cameras, battery chargers, bicycle lighting, danger triangles, avalanche beepers, flashlight, tv's, microwaves and other domestic appliances, garden lighting, garden sprayers and light regulating devices for windows, such as window blinds, awnings and etc., may be powered by the voltage converting circuit of the present invention.

The invention is most beneficial to small sized appliances by allowing a substantial reduction in surface of the solar cells.

BRIEF DESCRIPTION OF THE DRAWINGS

Some embodiments of a voltage-converting unit according to the present invention will be explained in detail with reference to the accompanying drawings. In the drawings.

DESCRIPTION OF THE PREFERRED EMBODIMENTS

Figure 1:
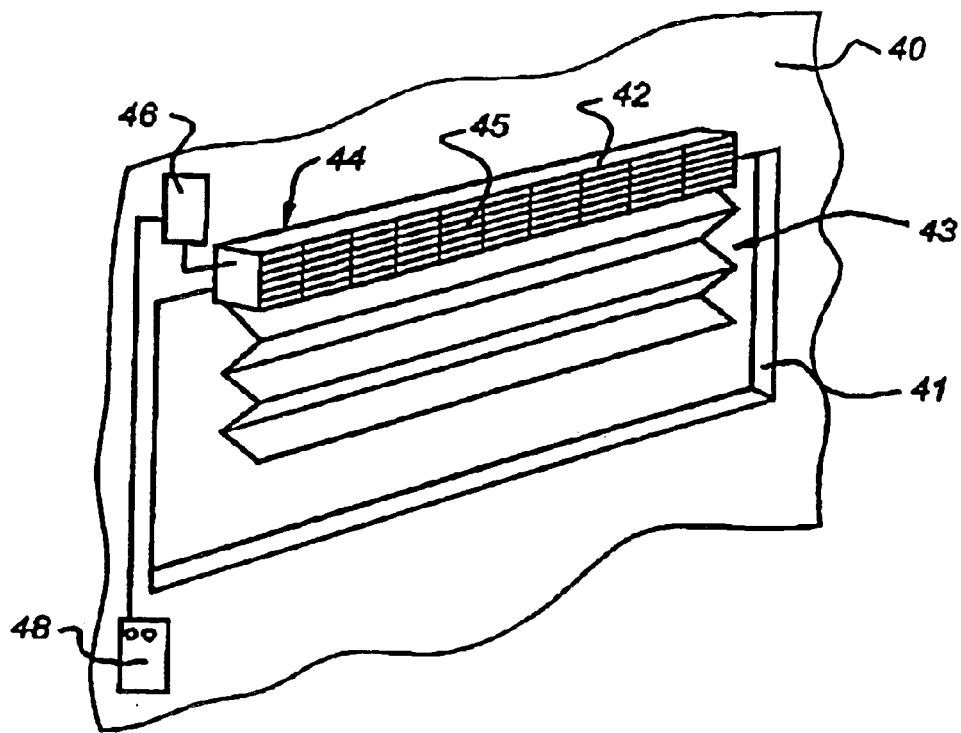
FIG. 1 shows an architectural covering device according to the present invention comprising a pleated light regulating device.

FIG. 1 shows a wall 40 having a window 41 along the upper end of which a head rail 42 of a pleated window covering 43 is mounted. On the head rail a drive assembly 44 is mounted comprising an array of photovoltaic cells (solar cells) 45 facing towards the interior of the wall 40, an electric drive assembly 46 comprising a drive motor, an accumulator and a step-up converter connecting the accumulator to the solar cells 45. The assembly 46 can be completely integrated into the head rail 42 or can be provided as a separate unit attached to the wall 40. Control unit 48 for raising or lowering the window covering 43 is connected to the drive assembly 46.

Figure 2:
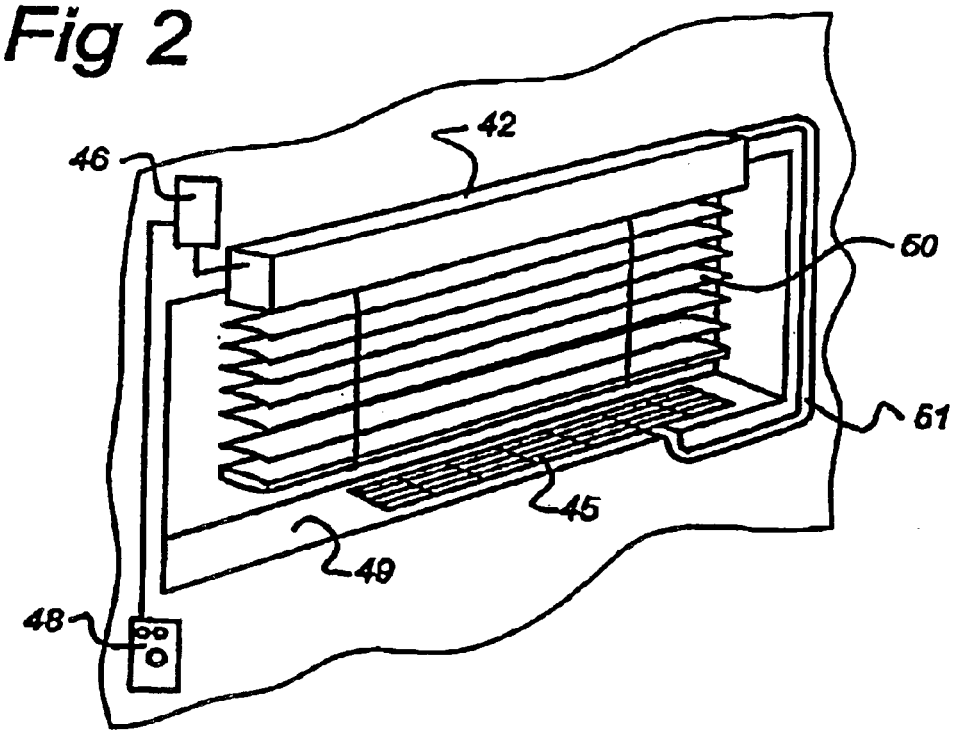
FIG. 2 shows an architectural covering device according to the present invention comprising a venetian blind.

FIG. 2 shows an alternative embodiment of a window covering comprising a vertically deploying venetian blind, having horizontal slats 50 suspended from a head rail 42. Solar cells 45 are mounted on a windowsill and connected through electrical leads 51 to drive assembly 46. By operation of the control unit 48 the slats 50 may be raised or lowered or may be changed in orientation by rotating around their longitudinal axes.

Figure 3:
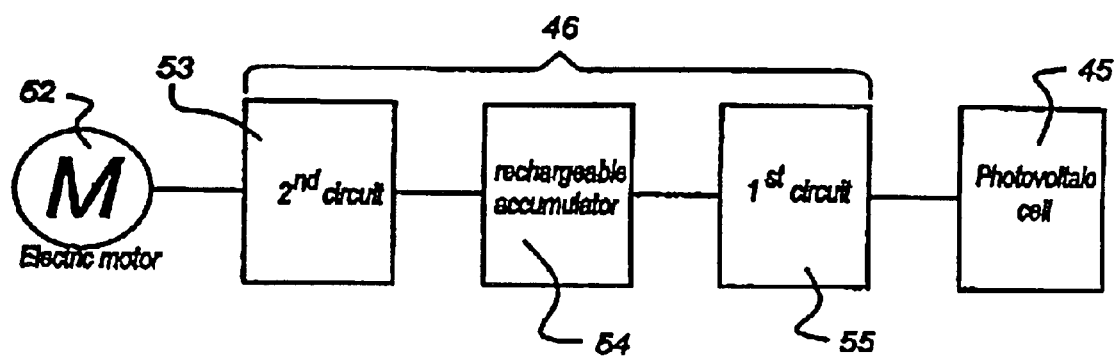
FIG. 3 shows schematically the drive assembly according to the present invention.

FIG. 3 schematically shows a drive assembly according to the present invention, comprising an electric motor 52 for raising or lowering the window covering and/or changing the orientation of the slats 50, an electrical circuit 53, an accumulator or battery 54, a step-up converter 55 and a photovoltaic cell 45. The electrical circuit 53 may comprise a step-up converter for increasing the voltage derived from the battery 54. The battery 54 may comprise a metal hydride accumulator, an alkaline manganese battery, a lithium ion battery, or a plurality of lithium ion batteries in series.

In an embodiment, the accumulator has a capacity not exceeding 1.4 Ah. The battery may be a 3.6 V battery system, whereas the electric motor 52 may operate at 12 V DC at the power requirement not exceeding 50 mWh per day.

In a preferred embodiment the active operation of the electric motor 52 does not exceed 40 s per day.

Figure 4:
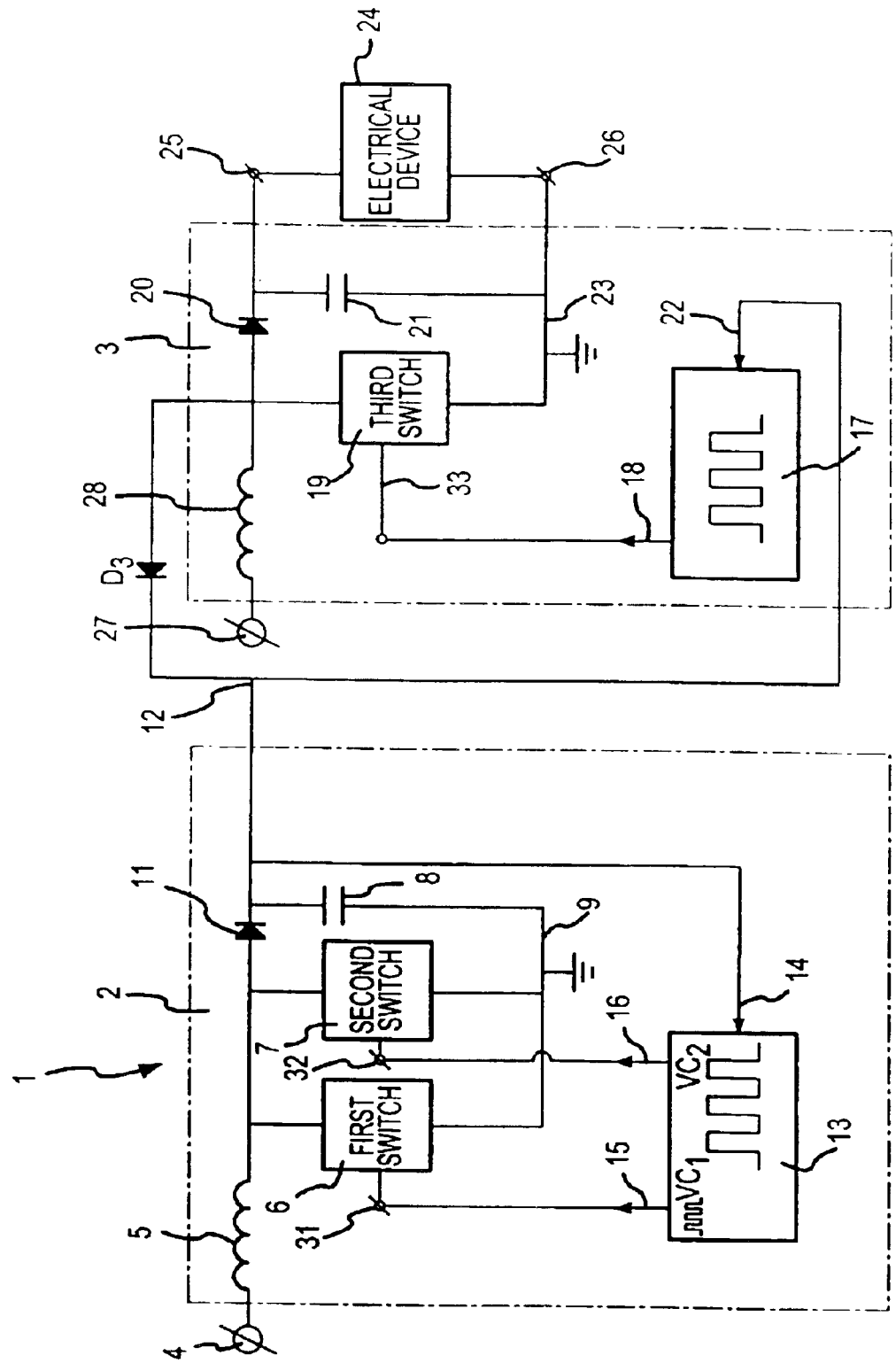
FIG. 4 schematically shows an assembly of a voltage converting circuit according to the present invention in combination with a DC—DC step-up voltage converter connected to an electrical device.

FIG. 4 shows a step-up voltage converting unit 1 having a voltage converting circuit, or low voltage converter stage 2, connected to a second converter stage 3. The low voltage converter stage 2 comprises an input terminal 4, an inductive element 5, first and second switches 6, 7 and a capacitive element such as capacitor 8. Switches 6 and 7 are with a first terminal connected to the inductive element 5 and with a second terminal to a reference voltage line 9. The second terminal of capacitive element 8 is connected to the output of a diode 11 and to the supply voltage terminal 12. The supply voltage terminal 12 is connected to a power input 14 of a first oscillator 13. A start-up output 15 of the first oscillator 13 is connected to the base or gate electrode 31 of switch 6 whereas the oscillator output 16 is connected to the gate electrode 32 of switch 7. The supply voltage at an output terminal 12 of low voltage converter stage 2 is connected to the second terminal of inductive element 28 and to a power input 22 of second oscillator 17 of second converter stage 3. The oscillator output 18 connects to the gate electrode 33 of switch 19. A diode 20 and capacitive element or capacitor 21 are connected between the inductive element 28 and reference voltage line 23. Electrical device 24 is connected across output terminals 25, 26 of second converter stage 3.

When at start-up a varying low voltage supply, such as a solar cell, is connected to input terminals 4 and 27 of the voltage converting unit 1, and switches 6, 7 are closed, the capacitive element 8 is charged, creating a small voltage on the output terminal 12 and on first oscillator power input 14. The small power input into the oscillator 13, results in a pulse shaped signal on start-up output 15 at a low gate control voltage level $V_{C1}$, which may be a few tenths of volts, periodically opening and closing the switch 6 at the frequency of for instance 100 kHz. This causes a periodic current through the switch 6 resulting in a rising current through the inductive element 5, charging capacitor 8 that is rectified by diode 11 and results in an increasing voltage at the supply voltage terminal 12 and consequently at the power input 14 of the first oscillator 13. This effect continues until the voltage level at supply terminal 12 reaches a predetermined level, after which low voltage controlled switch 6 is de-activated (opened) and high voltage controlled switch 7 is operated from oscillator output 16. The second switch 7 is operated at a control voltage level $V_{C2}$ until the supply voltage at supply voltage terminal 12 is for instance a few volts. The supply voltage is input into second converter stage 3 at the second terminal of inductive element 28 and into power input 22 of second oscillator 17. At oscillator output 18, a pulsed control signal operating the gate electrode 33 of switch 19 is generated. By switching on and off the switch 19, the energy stored in inductive element 28 is transferred to capacitor 21 until a predetermined voltage level is reached. At this predetermined level, such as voltage levels between 1.5–12 V, switch 19 is opened such that electrical energy is stored in inductive element 28, to be released again upon closing of the switch 19.

As the step-up voltage-converting unit 1 generates its own supply voltage from a situation of rest, the step-up converter is self-starting.

Figure 5:
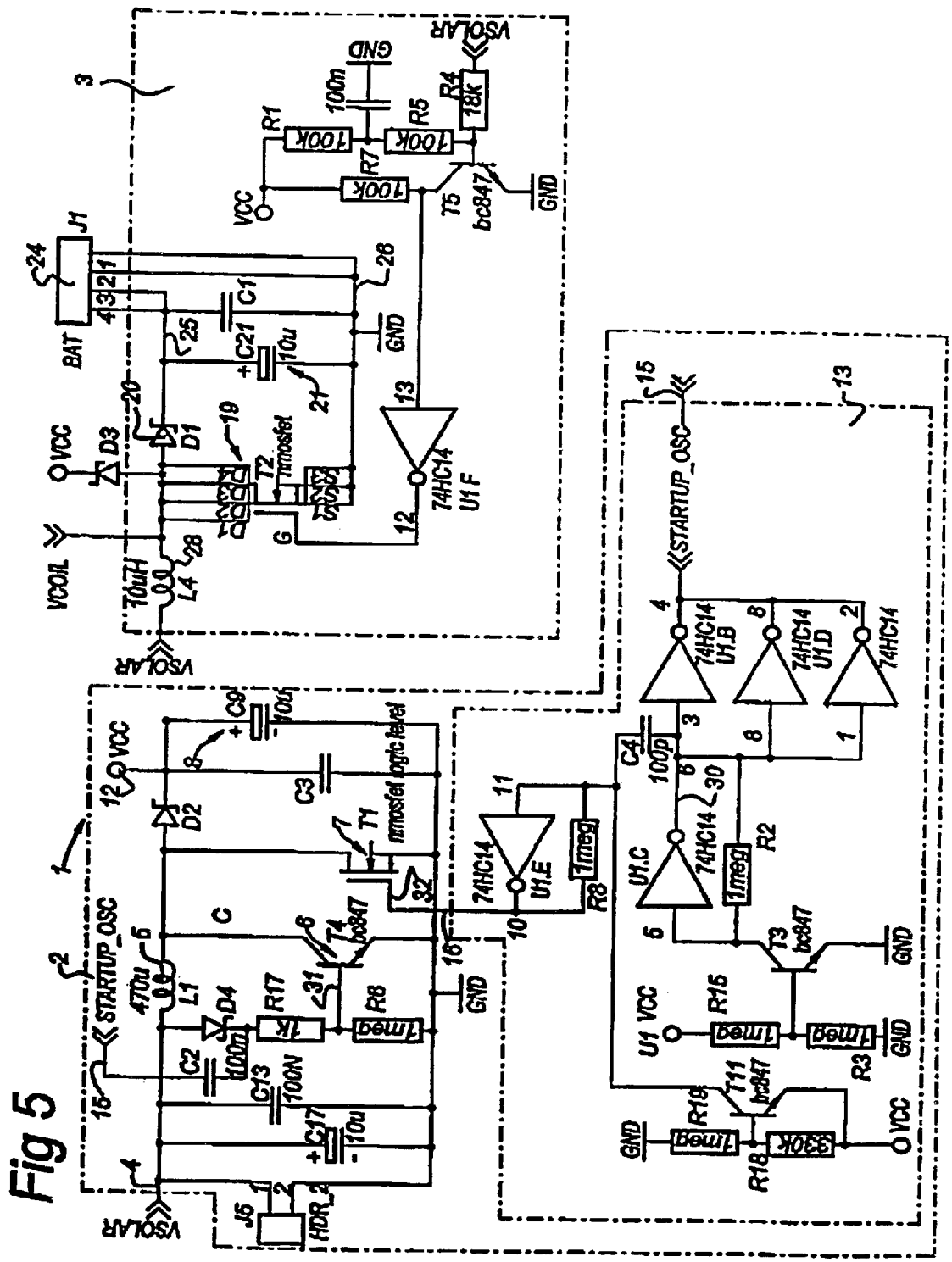
FIG. 5 shows in detail the components of the voltage converting circuit and DC—DC converter of FIG. 1.

FIG. 5 shows in detail the components of the voltage converter stage 2 and second converter stage 3 according to the present invention. The following letter symbols apply:
$T_1$ low power, logic level MOSFET;
$T_2$ switching MOSFET; power MOSFET;
$L_1$ switching coil with high inductance;
$L_4$ switching coil;
$D_1$, $D_2$ rectifying diodes;
$C_9$, $C_{21}$, $C_1$ smoothening electrically controllable capacitors (elco's);
$U_{1A}$–$U_{1F}$, $U_{1C}$ low voltage inverter gates manufactured by Philips Electronics under type number 74HC14;
$T_4$ switching bipolar transistor;
$D_2$, $D_4$ Schottky diodes;
$C_3$ relatively small capacitor.

The second converter stage 3 operates according to known DC—DC voltage converter principles according to which the small fluctuating voltage V-solar at the input of coil 28 is stored in the coil when switching MOSFET 19 is opened. Upon closing of the switching MOSFET 19, the energy is released from the coil 28 and supplied via rectifier diode 20 to smoothing capacitors 21 resulting in an increased voltage across output terminals 25, 26. In order to be self-starting, voltage converter circuit or step-up circuit 2 is provided wherein the oscillator 13 is constructed of active component of the type of Philips low voltage inverter ports or gates $U_{1C}$ and $U_{1E}$. The inverter ports can generate at their output, voltages at an input voltage of $V_{CC}$ of below 0.4 V at start-up.

At low supply voltages $V_{CC}$, transistor $T_3$ is switched-off and a very low alternating voltage is supplied via start-up output 15 of oscillator 13 to a coupling capacitor $C_2$, and from thereon to the base 31 of transistor $T_4$. Schottky diode $D_4$ is used as a positive clamp such that a small alternating voltage appears on the base 31 with an offset of 0.4 V. The solar cell voltage is about 0.4 V. The transistor $T_4$ will go in conduction at a gate voltage of about 0.6 V, such that the gate voltage need only be 0.2 V in order to get transistor $T_4$ into conduction. It has appeared that the oscillating inverter gate $U_{1C}$ of oscillator 13 can supply enough energy to get the transistor $T_4$ into conduction. This causes a periodic current in the collector c of transistor $T_4$. Since the transistor $T_4$ is coupled with a switching coil with a relatively high inductance $L_1$ and a relatively small capacitor $C_3$, the periodic current in the collector c results in an AC voltage across the coil 5. This AC-voltage is rectified through Schottky diode $D_2$ and appears on supply voltage terminal 12 and is fed back at the supply of low voltage inverter gates $U_{1C}$–$U_{1F}$. Each time $V_{CC}$ rises, the voltage level at the start-up output 15 of the oscillator 13 rises, resulting in better control of switching transistor $T_4$. Proper gating of transistor $T_4$ results in more power being stored in coil 5, increasing supply terminal voltage $V_{CC}$ etc. At the outlet 30 of the oscillator $U_{1C}$, a coupling capacitor $C_4$ is provided which operates a low voltage inverter gate $U_{1E}$. The output of the oscillator $U_{1E}$ is connected to the control gate 32 of a low power logic level of the MOSFET $T_1$. The coupling capacitor $C_4$ ensures that the MOSFET of $T_1$ switches at the beginning or start-up in phase with transistor $T_4$.

When the supply voltage $V_{CC}$ rises above the threshold level of logic level MOSFET $T_1$, transistor $T_3$ goes into conduction, pulling the input of oscillator $U_{1C}$ to ground such that first transistor $T_4$ is switched-off and logic level MOSFET $T_1$ takes over. Now $V_{CC}$ can rise to for instance 3 V wherein the final power conversion up to voltages ranging from 1.5–12.0 V is effected by power MOSFET $T_2$ of second converter stage 3. When $V_{CC}$ reaches its desired end level, the varying supply level V-solar will place transistor $T_5$ in conduction pulling the input of oscillator $U_{1F}$ to ground and de-activating switch $T_2$.

Figure 6:
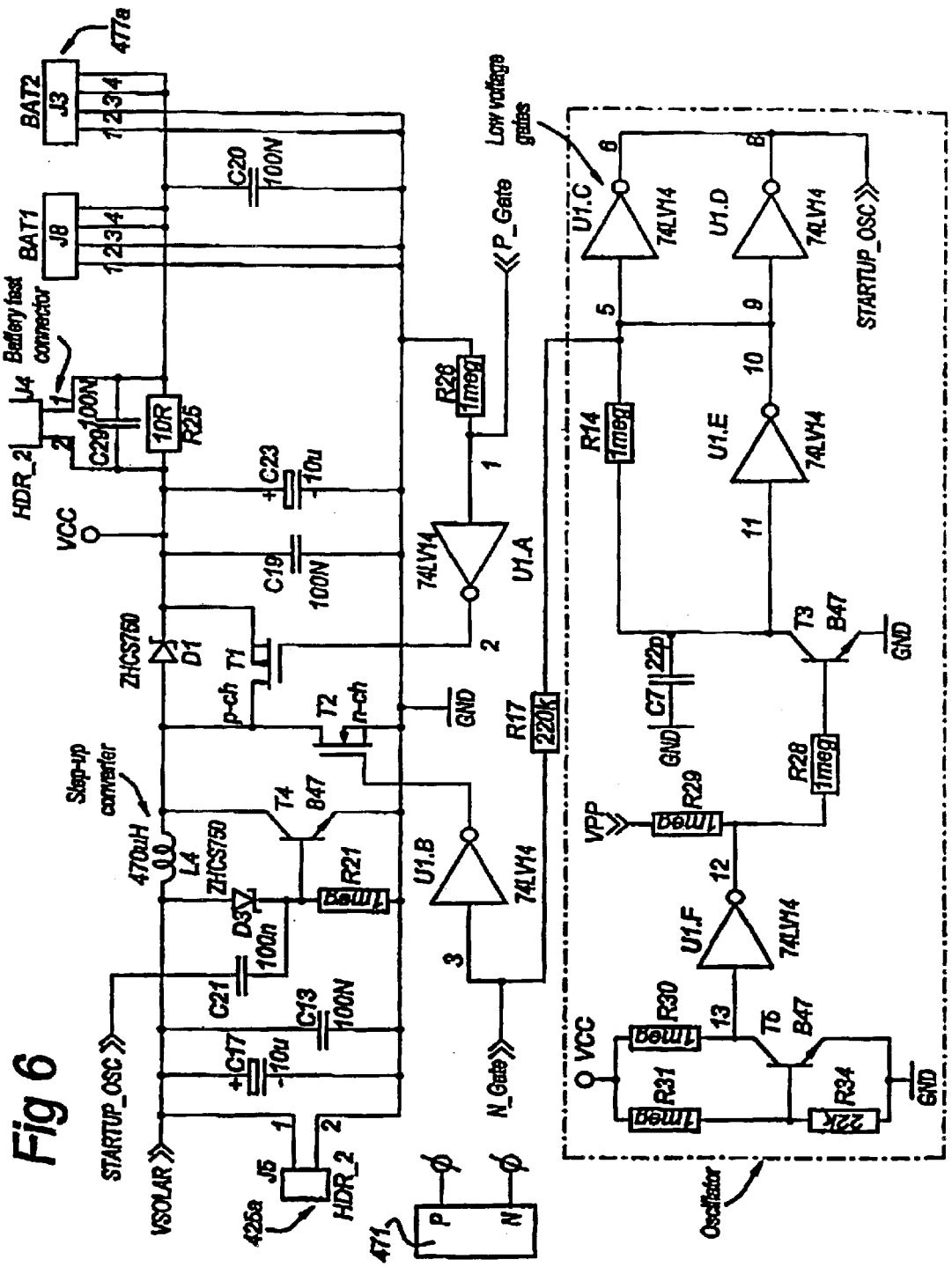
FIG. 6 shows an alternative embodiment of a voltage converting circuit according to the present invention wherein the second switch is controlled by a microprocessor.

FIG. 6 shows another embodiment of a low voltage solar converter including a step-up DC—DC converter (sometimes also called: a voltage increasing chopper). The main components of the step-up converter are: inductor/inductance $L_4$; semiconductor switch $T_4$ and supplemental N-channel MOSFET $T_2$; diode $D_1$ (Schottky ZHCS 750) and capacitor/capacitance in the form of high capacity elco $C_{23}$ compensated for low resistance by additional capacitors $C_{19}$ and $C_{20}$. Semiconductor switch $T_4$ operates the step-up converter at those times when the voltage is too low to operate the MOSFET switch $T_2$. Switch $T_4$ is operated by an oscillator circuit as indicated in FIG. 3 by a dash-dotted box. The output of the oscillator connects to the start-up oscillator connector of the step-up converter where Schottky diode $D_3$ (ZHCS 750) adds the output voltage of the solar panel 425a to the pulsed voltage generated by the oscillator. The resulting voltage is offered to the base of $T_4$. As soon as the voltage offered to the step-up converter is high enough for the MOSFET switch $T_2$ to operate, the oscillator output is grounded through semiconductor $T_3$ of the oscillator circuit.

Then the MOSFET $T_2$ is controlled from the "N-gate" output of the central micro processor 471 and a further P-channel MOSFET $T_1$ is controlled from the "P-gate" output of the processor 471 to take over from the Schottky diode $D_1$. The P and N-gates of the processor 471 are software driven. In this manner a particularly advantageous step-up converter has been obtained. The alternative use of semiconductor switches $T_4$ and $T_2$ provides for a register of compound step-up converter that has optimal characteristics for each of a low voltage and a higher voltage range. The use of Schottky diode $D_3$ enables to offer an as high as possible voltage to the base of the low voltage semiconductor switch $T_4$. The additional MOSFET switch $T_1$, which is positioned in parallel to diode $D_1$, allows to eliminate the losses, which normally occur in diodes such as $D_1$.

Figure 7:
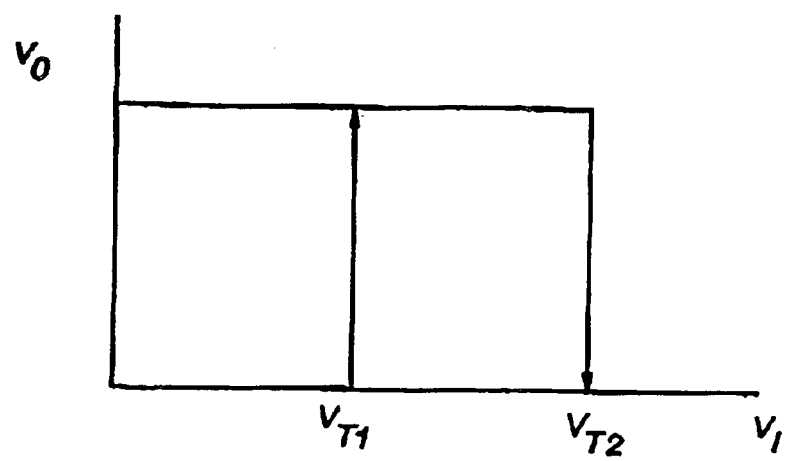
FIG. 7 shows a schematic diagram of the input and output voltages of the inverters $U_{1C}$ and $U_{1E}$.
Figure 8:
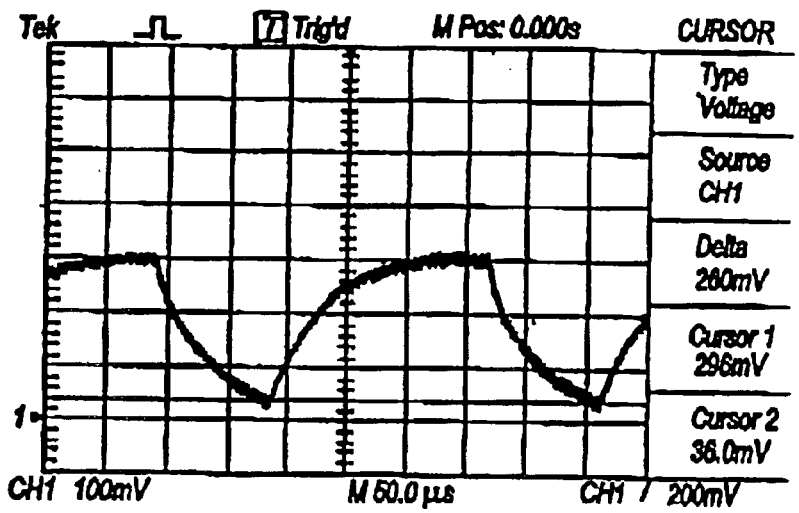
FIG. 8 shows an input voltage of inverter $U_{1C}$ during start-up.

FIG. 7 shows the input and output voltages $V_1$, $V_0$ of inverter ports $U_{1C}$ and $U_{1E}$ which are inverting Schmitt-trigger inverter ports. Generally, at a supply voltage $V_{CC}$ of 1 V, the negative-going threshold $V_{T1}$ will be about 0.5 V, the positive-going threshold $V_{T2}$ being several tenths of Volts higher. The output voltage $V_0$ will be limited to a maximum of supply voltage $V_{CC}$. The inventors have found out that at supply voltages $V_{CC}$ below specification of the manufacturer, there is a region of the inverter port below $V_{T1}$ at which at low supply voltage $V_{CC}$ there still is a hysterises in the output signal such that an oscillator can be obtained by feedback of the output signal to the input via resistor $R_2$. At a supply voltage of $V_{CC}$ 0.4 V the input at the inverter gate $U_{1C}$ is given in FIG. 8, at a level of about 300 mV, at a frequency of about 4 kHz.

Figure 9:
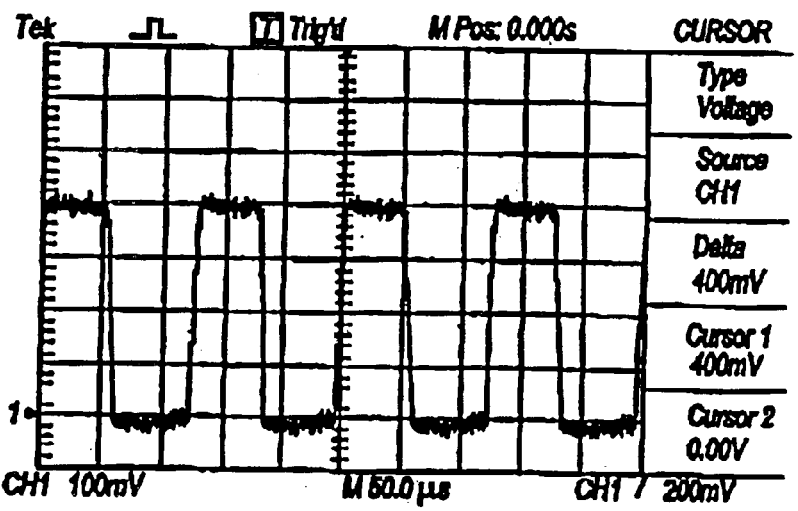
FIG. 9 shows an output voltage of inverter $U_{1C}$ during start-up.

In FIG. 9, the output at inverter gate $U_{1C}$ is given at a level of 400 mV with a frequency of about 20 kHz. Surprisingly, at low supply voltages $V_{CC}$ and at low input levels below the negative-going threshold $V_{T1}$ according to specifications, it is still possible to obtain an oscillator using inverter gate $U_{1C}$ such that start-up of the step-up converter can be obtained by use of said component.

We claim:

1. In combination a power supply and electrically operated architectural covering device, the power supply including:
   a voltage or current source having a varying voltage output;
   an electrical device; and
   a voltage converting unit electrically coupling the voltage or current source to the electrical device, wherein the voltage converting unit includes a step-up converter, the step-up converter having an inductive element, and wherein the voltage or current source is the sole supply of power to the voltage converting circuit, which thereby is self-starting from a situation of rest.

2. The combined power supply and architectural covering device according to claim 1, wherein the voltage or current source is a solar cell generating a voltage of less than 0.5 V.

3. The combined power supply and architectural covering device according to claim 2, wherein the electrical device is a battery.

4. The combined power supply and architectural covering device according to claim 1, wherein the electrical device is a battery.

5. Electrically operated architectural covering device, including:
   a first rail;
   a covering member extending from the first rail;
   an electric motor for opening and closing the architectural covering device;
   at least one photovoltaic cell;
   a rechargeable power source;
   a first circuit electrically coupling at least one photovoltaic cell to the rechargeable power source; and
   a second circuit electrically coupling the electric motor to the rechargeable power source, wherein the first circuit includes a step-up converter, the step-up converter having an inductive element, and wherein the electric motor is mounted to the first rail.

6. Electrically operated architectural covering device according to claim 5, wherein the rechargeable power source is a Nickel Metal Hydride accumulator.

7. Electrically operated architectural covering device according to claim 5, wherein the step-up converter includes a MOSFET semiconductor element.

8. Electrically operated architectural covering device according to claim 5, wherein the step-up converted includes a Schottky diode.

9. Electrically operated architectural covering device according to claim 5, wherein the second circuit includes a step-up converter for increasing the voltage of the rechargeable power source to a level necessary for the operation of the electric motor.

10. Electrically operated architectural covering device according to claim 5, wherein the photovoltaic cell is adapted to be fixedly mounted to an inward facing surface of the first rail.

11. Electrically operated architectural covering device according to claim 5, wherein the rechargeable power source is a metal hydride accumulator.

12. Electrically operated architectural covering device according to claim 5, wherein the rechargeable power source is alkaline manganese battery.

13. Electrically operated architectural covering device according to claim 5, wherein the rechargeable power source is a lithium ion battery.

14. Electrically operated architectural covering device according to claim 13, wherein the rechargeable power source includes a plurality of lithium ion batteries in series connection.

15. Electrically operated architectural covering device according to claim 5, wherein the rechargeable power source is a 3.6 V battery system.

16. Electrically operated architectural covering device according to claim 5, wherein the covering member comprises an extendible and retractable pleated window covering.

17. Electrically operated architectural covering device according to claim 5, wherein the covering member comprises an array of operatively interconnected slats, each having an open and a closed position within the covering member.

18. Electrically operated architectural covering device according to claim 5, wherein the operation of the electric motor does not exceed 40 seconds per day.

19. Electrically operated architectural covering device according to claim 18, wherein the electric motor operates on 12 V DC.

20. Electrically operated architectural covering device according to claim 18, wherein the daily power requirement of the electric motor is about 50 mWh/day.

21. Electrically operated architectural covering device according to claim 20, wherein the electric motor operates on 12 V DC.

22. A drive assembly for a covering of an architectural opening, comprising a motor, an accumulator connected to the motor, a solar cell, and an electrical circuit connecting the solar cell to the accumulator, wherein the electrical circuit comprises a step-up converter, having an inductive element, that transforms fluctuating voltage or current from the solar cell to DC current to charge the accumulator.

* * * * *